Figure 4:
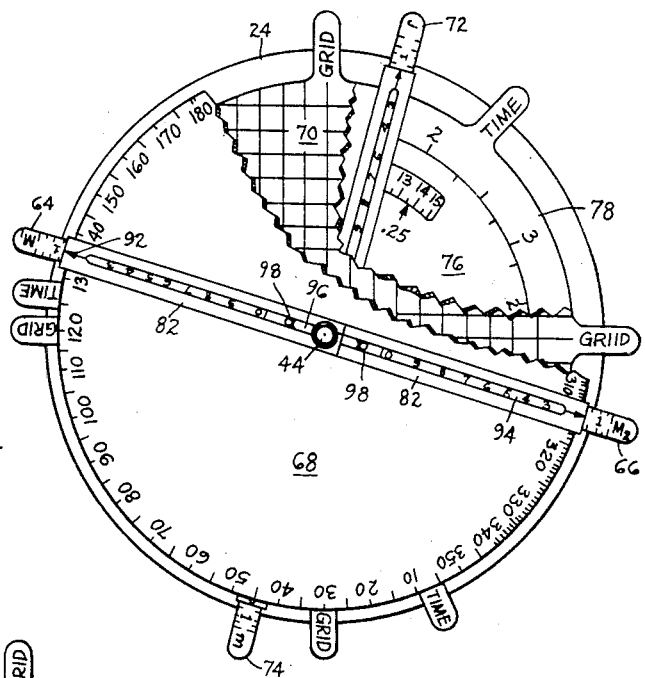
Figure 6:
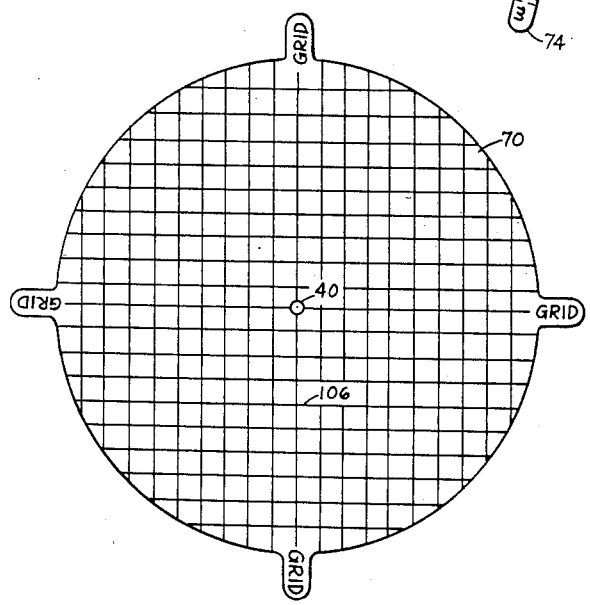

Jan. 29, 1957 W. M. SHANHOUSE 2,779,538
NAVIGATIONAL RELATIVE MOTION COMPUTER
Filed June 13, 1952 3 Sheets-Sheet 1
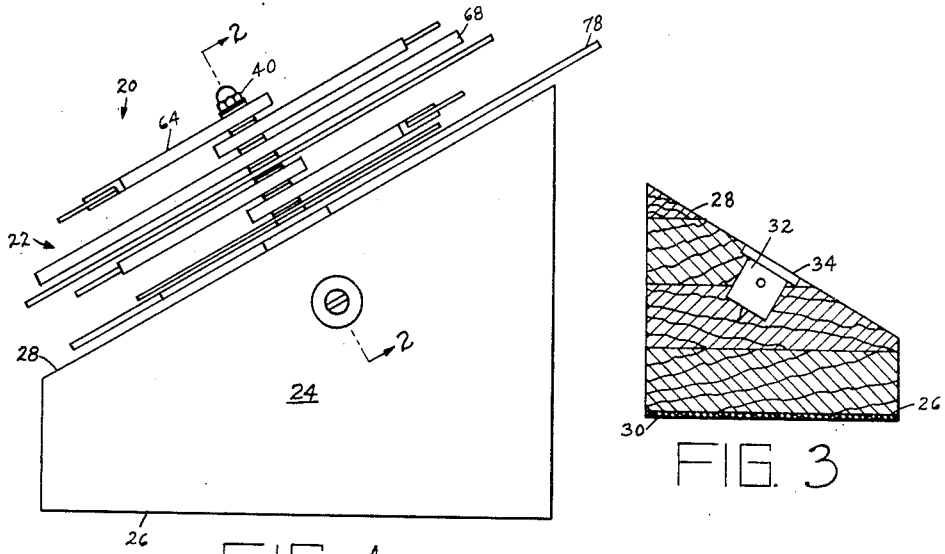
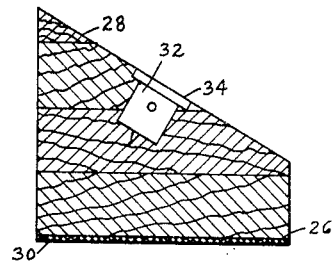
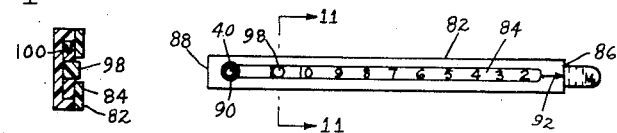
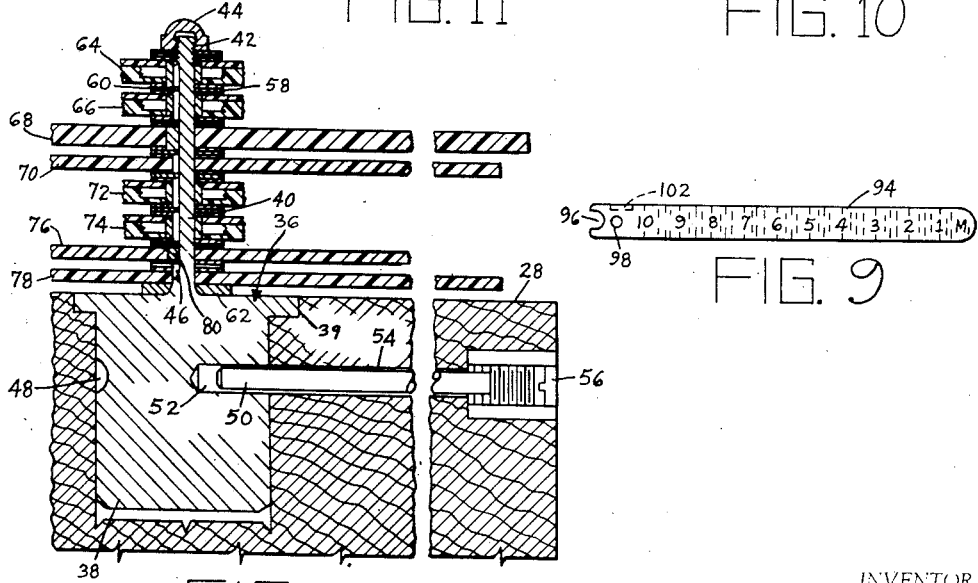
INVENTOR
WILLIAM M. SHANHOUSE
BY
ATTORNEY

INVENTOR
WILLIAM M. SHANHOUSE
BY
ATTORNEY

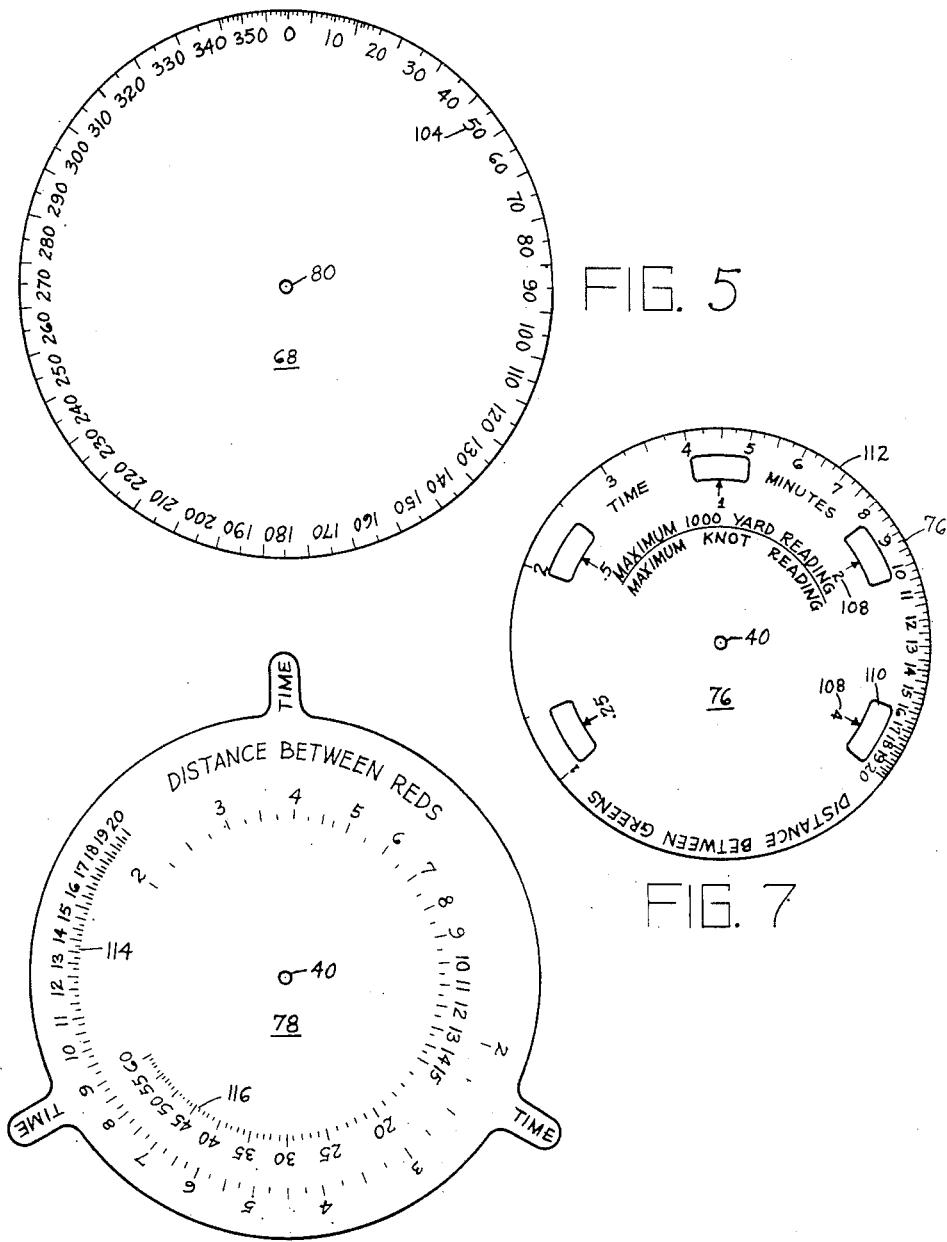

2,779,538

NAVIGATIONAL RELATIVE MOTION COMPUTER

William M. Shanhouse, Roslyn Heights, N. Y.

Application June 13, 1952, Serial No. 293,492

7 Claims. (Cl. 235—61)

(Granted under Title 35, U. S. Code (1952), sec. 266)

The invention described herein may be manufactured and used by or for the Government of the United States of America for governmental purposes without the payment of any royalties thereon or therefor.

This invention relates to a relative motion computer and is designed to replace the maneuvering and plotting board currently used for such determinations.

Ordinarily, in order to plot the relationship of other vehicles such as ships or planes to the reference vehicle, the standard maneuvering board is used to graphically show such relative movement. Thus, relative movement signifies not only actual motion, but also motion relative to a moving point. Or, to illustrate, when a ship is anchored and it observes another ship in motion, that represents actual motion. But when the first ship gets under way, the movements of the other ship appears to be different, for that is relative movement. The relative movement method then uses a maneuvering board in which the relative plot or motion triangle diagram and vector or speed triangle diagram are shown. The relative plot indicates bearings and distances and the vector diagram indicates courses and speeds. It is convenient to draw both diagrams on a single sheet of paper with a common center, though this is not essential. As a result, in addition to the complex plotting involved, a multiplicity of materials must be used. Further, the chances for errors occurring in the calculations is always present, sometimes with disastrous results. It is therefore imperative that a long training period be completed before accurate use of the maneuvering board is possible.

The present invention is designed to replace the maneuvering board together with the necessity for employing drafting materials, pencils, etc. In addition, it is convenient to handle and it may readily be set on a flat surface or mounted on a bulkhead. No external implements are required and by virtue of its extreme simplicity, the probability of error is greatly reduced. Also, since the computer requires only manual setting of the known quantities and a reading of desired, unknown quantities to obtain the solution to a problem, no understanding of the theory of relative motion is required and a short training period is satisfactory.

A general object of the invention is to provide a relative motion computer that will replace the usual maneuvering board in use today.

Another general object of the invention is to reduce the training period required for relative motion computing. Another object of the invention is to reduce the time required to solve a given problem to a fraction of the time employed by current methods.

Yet another object of the invention is to provide a simple device incorporating all required elements into a single unit and to thereby eliminate the use of drafting tools and other supplies apt to be lost or mislaid.

Still another object of the invention is to obviate the necessity for first learning the theory of relative motion before maneuvering board problems can be solved and through this device enable any person of usual intelligence to solve an unknown factor on being given a known set of quantities.

And yet another object of the invention is to provide a compact instrument, simple and economical in construction and durable in use.

Other objects and many of the attendant advantages of this invention will be readily appreciated as the same becomes better understood by reference to the following detailed description when considered in connection with the accompanying drawings wherein:

Fig. 1 is an end view of the computer,

Fig. 2 is a vertical section taken on lines 2—2 of Fig. 1 illustrating the mounting of the computer elements, Fig. 3 is a longitudinal section taken on the pedestal of the computer, Fig. 4 is a plan view, partly in section, of the computer, Figs. 5–8 illustrate the various individual disc elements comprising the computer, Fig. 9 shows an arm used to indicate distance or speed and marked with suitable graduations thereon, Fig. 10 illustrates the arm of Fig. 9 in the channel guide, and Fig. 11 is a cross-section taken on lines 11—11 of Fig. 10.

Referring to Figs. 1–3, 20 refers to the computer assembly and consists of the computer elements 22 and stand or pedestal 24. Stand 24 consists of a flat base 26 and inclined table 28, whereon computer 22 is mounted. A felt pad 30 is provided, if desired. Table 28 is preferably coated white to provide ready visibility, but obviously any other desired color may be employed. Stand 24 is counterbored at the table surface at an inclined angle at 32. Stand 24 is also provided with a shoulder 34 to receive computer mounting means 36. Mount 36 contains a base 38 and flange 39 adapted to be received in bore 32 and is retained by shoulder 34. Mount 36 extends beyond table 28 in the form of a rod or post 40 and is adapted to retain computer elements 20 along its vertical length. Post 40 is threaded at its free end 42 to receive acorn nut or the like, 44. Post 40 is also provided with keyway 46 to prevent rotation of certain of the computer elements, as will subsequently appear.

Computer base 38 is grooved annularly at 48 for rotation to the desired position when set screw 50 is withdrawn from horizontal recess 52 in base 38. Set screw 50 extends through slot 54 which is in axial alignment with recess 52 and is threadedly adjustable in the enlarged bore 56 extending outwardly to the exterior of pedestal 24. Thus, if the device is placed on a table, the computer is read at an angle of about 30° whereas if it is mounted on a bulkhead, set screw 50 is removed and computer 22 is rotated to a second position for observation at a 60° angle, after which it remains fixed by means of the set screw.

A plurality of computer elements, as required for determining relative motion, are mounted on post 40 and are spaced from each other by suitable washers 58, or the like. These washers are provided with key portions 60 to be received in keyway 46 on post 40 and due to the close tolerance, there is no movement of the washers at any time. A spacing washer 62 assures against engagement with pedestal 24.

Mounted on post 40 in concentric relation are distance arms or handles 64 and 66, annular rose 68, grid 70, speed arms 72 and 74, maximum disc or plate 76 and time disc 78. While all of the arms, the grid and the time disc are adapted to rotate, both rose 68 and plate 76 are stationary by means of keys 80 held in keyway 40.

Referring to the radial arms, and as best represented in Figs. 9–11, it will be noted that they are specifically marked, as by M₁ and M₂ to designate the distance readings and by m and r to represent speed readings. These letters have been selected to conform to the nautical symbols employed with the old methods in use at present.

Since the basic construction of the computer arms are identical, a description of one will suffice for all. However, while by no means essential, it has been found desirable to provide different colors for each set of arms to thereby permit visual recognition as to which set of factors in the computations are being determined. Thus, M₁ and M₂ are in red, whereas m and r are in green. Any desired colors may be used. Selecting arm 64 as illustrative, it is slidably retained within a channeled guide member 82 slotted at 84 along its upper surface and terminating short of each end 86, 88. Guide 82 is pivotally retained on post 40 by means of an enlarged aperture 90 adjacent inner edge 88 and extends radially outwardly along disc 68. Indicator arrow 92 is etched into the surface of channel guide 82 at the outer end to provide instant reading of the calculated distance.

The arms are marked with a graduated scale 94 from zero to ten and represent the distances or speeds of the reference or maneuvering vessel or plane, as the case may be. A semi-circular aperture 96 at the inner end of the radial arm permits a flush fit with post 40 in order to provide compact design. Dowels 98 are cemented or otherwise secured into the radial arms adjacent the inner ends thereof. The dowels will be marked by the selected color for distance or speed computations and serve to line up the calculations, as will soon be explained. In addition, dowels 98 provide the added function of stop means for the radial arms at the extreme length of travel of scale member 94. Since there is no close tolerance for the slide in the channel, guide spring 100 is retained in a recess 102 in the radial arms to provide binding action in order to retain the slide arm in set position.

Thus, in use, the arms are swung radially about transparent rose 68 to the selected positions to obtain the solution to the problem. Rose or disc 68 is located between the speed and distance arms and is circumferentially graduated from 0° to 360° at 104 along the periphery thereof.

Also positioned between the pairs of radial arms is grid 70. Grid 70 is also circular and is crossed throughout its periphery both vertically and horizontally by evenly spaced hairline markings 106 to form square boxes. These markings are used to determine both the computations for the radial arms and the time factor, as will presently become clear. Each square represents the same distance as is found between the digits of the radial arms.

It is generally desirable to know how much time it will take to complete the maneuver or change position. Opaque disc or plate 76 and time disc 78 are designed to solve this portion of the problem. Plate 76 is circular and of generally smaller diameter than time disc 78. Member 76 is adapted to show the time in minutes which is determined from the maximum 1,000 yard distance to speed reading ratio, shown at 108, and which is read through the proper window or slot 110. Scale graduations 112 on the periphery of plate 76 represents the speed factor and is taken from the distance on the grid between arms 72 and 74.

Time disc 78 represents the distance factor and is taken from the spaces on the grid between arms 64 and 66. Thus, scale 114 is the distance factor and scale 116 shows the time required for the maneuver when scales 112 and 114 are properly aligned.

From the above description, a given relative motion problem can be solved in a matter of seconds. Two examples will be set forth to illustrate the mode of operation of the computer, the first designated as A, to illustrate the manner of solving a change in position problem to give an answer in the form of new courses to be followed. The second is designated as B, wherein a course of flight of an airplane is determined in order to intercept a definite target.

Since the speeds and distances for aircraft will vary considerably from those used for surface navigation the present device must be capable of being read in terms of various scales which may be selected to correspond to the normal and maximum allowances of the particular problem and the solution.

In example A, therefore, each numbered digit on the M₁ and M₂ scales represents 2,000 yards, while each unit or digit on the m and r scales will represent four knots. In example B each digit on the M₁ and M₂ scales represents 20,000 yards while each digit on the m and r scales will represent eighty knots. It is obvious that any desired scale may be employed depending upon the limitations involved in the particular problem.

Returning to example A, in ship navigation the readings of positions and distance are given, for example, by a five digit number, as 14310. The first two digits (14) designates the distance in thousands of yards, while the last three digits (310) designates the angular position of 310°. According to the problem given, a destroyer, or reference ship, is steaming in formation at a position of 10,000 formation course zero degrees and at a speed of twenty knots on a course due north. Knowing the maximum distances and speeds apt to be used will be about 20,000 yards and forty knots, the computer is set up to give the present position in formation. Distance is indicated by the M arms, for convenience colored red, and since each unit of scale 94 represents 2,000 yards, the destroyer position of 10,000 yards will require five units. Thus, M₁ or arm 64 slide is pulled out until the numeral 5 aligns with the end of channel 82 at arrow 92. The 10,000 yard reading has now been obtained. Arm 64 is rotated from zero ° on rose 68 to 180° to represent the guide bearing which is the reciprocal of the zero degree position indicated by position numeral 10,000. The speed is twenty knots and since each digit on scale m represents four knots, five units are used. The green color of radial arm m or 74 designates speed and helps avoid confusion for the average operator. Arm 74 is slid out until numeral 5 appears at arrow 92. This is retained at zero degrees to indicate the formation course.

Orders are received to assume a new position of 14300 at a speed of thirty knots. To determine the course required at this speed to reach the new station, the operation given above is repeated using the other set of radial arms. M₂ arm 66 is slid out to digit 7 to represent the ratio between the digit distance and given distance of 14,000. Arm 66 is rotated to 120° as the reciprocal of 300° in the 14300 position. Grid 70 is now rotated until any desired line is brought into parallel relationship with the imaginary line existing between the two red dowels 98 on arms 64 and 66. Then r-arm 72 is slid out to read as 7½ at arrow 92 (30 knots) and is rotated until the green colored dowels 98 are in parallel relation as seen by the intersection of line 106 on grid 70. By reading the angular position of r-arm 72 on rose 68 directly, the new course of 297° is determined in a matter of seconds, with the chance for calculating errors being reduced to virtually nothing.

In addition, it is generally desirable to know how much time it will take to reach the new position. Through time elements 76 and 78, the required time can be readily determined. The spaces between the green dots of the speed indicating arms are read on grid 70. These are found to number seven. The number of spaces between the red dots of the position arms total six and a half. Time disc 78 is rotated until red number six and a half aligns with green number seven. The maximum distance and speed, as stated before, is known to be 20,000 yards and forty knots. Since the ratio between the maximum 1,000 yard reading of 20 (20,000÷1,000) and maximum knot reading of 40 is 0.5, the window 110 designated by such ratio on plate 76 is used and the time is ascertained to be 14 minutes. Provision is made for other distance-speed ratios as from 0.25 to 4.0 (see Fig. 7).

The computer serves the unique and useful function of maintaining an almost continuous solution in that the various settings can be made and readings taken in a matter of seconds without the aid of the old-fashioned and conventional plotting board. When steaming in formation readings of ranges and bearings at various intervals through the maneuver are constantly being taken. Under seldom existing ideal conditions it is possible to follow the predetermined relative motion line, i. e. by setting any observed range and bearing to guide on the $M_1$ arm, the red dots should still be aligned with the original grid settings. However, if there is any deviation from the proposed course and a reading is observed that indicates that the course is not along the predetermined grid line, this deviation may easily be computed. It may be found, for instance, that the range and bearing relative to the guide in the formation is 11,500 yards at 148°. In setting these values on the $M_1$ arm it is at once determined that the calculated relative motion line is not being followed. If the conventional plotting board were in use, an entirely new solution would have to be made. However, the present device merely requires realigning grid 70 with the red dots and swinging the r-arm down until the green dots are aligned. The reading on transparent rose 68 above the r-arm discloses the new course as being 281° or, if it is desired to reduce speed and maintain the original course, it is a simple matter to move the r-arm slide to align the green dots in order to obtain the reduced speed reading of 23 knots.

Example B applies the device in the solution of an intercept problem. It is assumed that a reconnaissance flight is being made along the course 325° at 260 knots. The maximum possible time and distance is known for this problem to be 200,000 yards and 800 knots. This determines the scale settings to be used, as was done in problem A. The speed factor or r-arm 72 is slideably adjusted to a value of three and a quarter to denote the speed of 260 knots and is then rotated to a position of 325° on rose 68. This represents the true reference position. A radar target is sighted at 261° and at a range of 80 miles. These values are set on the distance arm 64. As was stated above, each digit on distance scales 64 and 66 represents 20,000 yards while each digit on the speed scales 72, 74 represents 80 knots. This is determined from the known maximum speed and distances apt to be used. Since the nautical mile is 2,000 yards the maximum distance is 100 miles and 80 miles represents eight digits on the $M_1$ arm at 261°. Three minutes later the target is again sighted at 265° and 57 miles. The $M_2$ arm is set to represent the correct distance. Grid 70 is aligned with the red dots and by counting off the squares on the grid between the perpendicular line of the reference point, and remembering that each square represents the same distance as does each digit on the radial arms scale, it is seen that the closest point of approach of the sighted target is 14 miles. The elapsed time has been three minutes. This is therefore set up in the 0.25 window of opaque plate 76. Since the spaces on grid 70 between the parallel line of distance dowels 98 totals 2½, the reading on time disc 78, representing distance is taken opposite the 2½ marking and this is found to align with 6¼ on plate 76, this representing the speed factor. The m-arm 74 is then rotated along grid 70 until it is aligned with r-arm 72 at 6¼ spaces and the reading is taken to disclose the target's course to be 41° at 490 knots.

Thus, it is no longer necessary to use the cumbersome and time consuming maneuvering board to solve relative motion problems. However, by the present device, it is possible to go beyond the performance limits of the standard maneuvering board and to determine the best possible course to follow to avoid the approaching target.

It is to be remembered that the computer discloses the line of relative motion and that in order to avoid the approaching target, the best angle away from the target represents optimum conditions to avoid contact. This is determined by the line of relative speed. It is known that the target will be within fourteen miles in 6½ minutes. This time is determined by reading the grid spaces between the red dots as 5½ and between the green dots as 6¼. By rotating time disc 78 to align the distance reading with the speed reading, a time of 6½ minutes is obtained from window 110. The speed of the approaching target must be assumed to be fixed so that the only variable factor is the speed of the reference factor. If the maximum speed of the reference factor is some value less than the speed of the maneuvering factor, it is not possible to out-distance him, and therefore the best possible angle away is desirable. This is obtained instantly by rotating the grid and reference speed arm 72 to a line of relative speeds closest to the optimum time. Such line is one that is parallel to the position of the target arm 74 and is seen to be at 93° if the maximum speed of the reference factor happens to be 300 miles per hour.

Obviously many modifications and variations of the present invention are possible in the light of the above teachings. It is therefore to be understood that within the scope of the appended claims the invention may be practiced otherwise than as specifically described.

I claim:

1. In a relative motion device, a 360° graduated rose, a grid member mounted below said rose and axially aligned therewith, and speed and distance indicating means mounted radially with respect to said rose, said last named means comprising elongated channel shaped guide members and arms slidable within said guide members, said arms including scale means thereon to indicate the selected speed and distance.

2. The combination of claim 1 wherein the grid member is provided with crossed line markings for adjustment of indicating means to give the desired computation.

3. A relative motion computer comprising a stand, a post extending from said stand, a compass rose disk mounted on said post, a grid member mounted on said post in spaced relation to said rose disk, and speed and distance indicating means mounted on said post and extending radially therefrom, said last named means comprising elongated channel shaped guide members, arms slidable within the guide members, said arms including scale means thereon, and pins extending from said arms for lining up said grid member and acting as stop means for said arms.

4. The combination of claim 3 wherein said stand has an inclined surface, a bore in said stand, a base adjustably held in said bore, said post extending from said base, and means in said stand and engaging said base to enable adjustment of the computer.

5. The combination of claim 4, wherein said post includes key means to prevent rotation of certain of the computer elements, and said base engaging means comprises a set screw extending through said stand and into an annular groove in said base.

6. The combination of claim 3 wherein said disk and grid members are transparent.

7. A relative motion computer including a support, a 360° compass rose disk fixed on said support, a grid member rotatively mounted on said support, said grid member having crossed line markings, distance indicating arms mounted above said rose disk on said support for radial adjustment thereon, speed indicating arms mounted below said grid member on said support for radial adjustment, indicia on said arms along the length thereof, means for mounting said arms comprising channel means slidably receiving said arms, said channel means being pivotally secured on said support, an elongated slot in each channel means, and dowels extending from said arms and through said slots, said dowels serving to line up the markings on the grid member and acting as stop means for the outward movement of said arms.

(References on following page)

References Cited in the file of this patent

UNITED STATES PATENTS

| | | |
|---|---|---|
| 1,917,278 | Van H. Weems | July 11, 1933 |
| 2,099,713 | Willson | Nov. 23, 1937 |
| 2,328,881 | Saunders | Sept. 7, 1943 |
| 2,350,424 | Smith | June 6, 1944 |
| 2,357,131 | Putnam | Aug. 29, 1944 |
| 2,534,288 | Merriam, Jr. | Dec. 19, 1950 |

FOREIGN PATENTS

| | | |
|---|---|---|
| 9,190 | Great Britain | Apr. 20, 1914 |
| 149,158 | Great Britain | Aug. 12, 1920 |
| 694,083 | France | Sept. 9, 1930 |